United States Patent
Deml et al.

[11] 3,948,660
[45] Apr. 6, 1976

[54] METHOD FOR THE MANUFACTURE OF FRESNEL LENSES USING LIGHT-SENSITIVE MATERIALS

[75] Inventors: Reinhold Deml, Munich; Ulrich Greis, Weyarn, both of Germany

[73] Assignee: AGFA-Gevaert, A.G., Leverkusen, Germany

[22] Filed: Aug. 2, 1973

[21] Appl. No.: 385,192

[30] Foreign Application Priority Data
Aug. 5, 1972 Germany............................ 2239853

[52] U.S. Cl.................. 96/38.3; 96/27 R; 96/27 E; 350/178; 350/211
[51] Int. Cl.² . G03C 5/00; G03C 11/00; G03C 5/04
[58] Field of Search ................ 96/38.3, 27 R, 27 E; 350/211, 320, 178; 355/9

[56] References Cited
UNITED STATES PATENTS

| | | |
|---|---|---|
| 3,072,742 | 1/1963 | Block.................................. 350/178 |
| 3,725,106 | 4/1973 | Hosokosni ........................... 96/36.1 |
| 3,728,118 | 4/1973 | Fillmore et al...................... 96/27 R |
| 3,743,507 | 7/1973 | Ih et al................................ 96/38.3 |
| 3,764,366 | 10/1973 | Ninagawa et al. ................... 96/36.1 |
| 3,775,110 | 11/1973 | Bestenreiner et al................ 96/38.3 |

*Primary Examiner*—Edward C. Kimlin
*Attorney, Agent, or Firm*—Michael J. Striker

[57] ABSTRACT

In a method of forming a Fresnel lens from a body of light-sensitive material of the type which undergoes changes in its optical path-length when exposed to light, the step of exposing each portion of such body of light-sensitive material to light to the extent necessary to impart to the respective portion the optical path-length requisite for the corresponding portion of the Fresnel lens to be formed.

15 Claims, 7 Drawing Figures

METHOD FOR THE MANUFACTURE OF FRESNEL LENSES USING LIGHT-SENSITIVE MATERIALS

BACKGROUND OF THE INVENTION

The invention relates to a method and an arrangement for the making of Fresnel lenses.

Fresnel lenses have long been used in searchlights, vehicle headlights, and the like, because they have the advantage that although they are light in weight they can be formed with the large diameters and short focal lengths usually associated with more massive lenses. Such Fresnel lenses are formed by molding plastic or glass. The molds for these lenses must be produced by mechanical means, and as a result lower limits are placed on the shortening of the focal length that can actually be achieved if lenses of worthwhile quality are to be produced.

Also known in the art are so-called Fresnel zone plates, which are formed by graphing interfering spherical wavefronts. These Fresnel zone plates have two focal points, that is, these zone plates create both a real and also a virtual image. In addition, the efficiency of such zone plates is somewhat poor, inasmuch as only part of the light incident upon the zones is diffracted.

SUMMARY OF THE INVENTION

It is the general object of the present invention to provide a method and an arrangement for the manufacture of high-quality Fresnel lenses of high efficiency and having only a single focal point.

It is contemplated to achieve this goal by producing the different optical path-lengths of the lens not by mechanical means but rather by differently exposing different portions of a light-sensitive material of the type whose optical path-length undergoes changes in dependence upon the degree of exposure of the material to light.

As the light-sensitive material, it is contemplated to use a dichromated gelatin layer or a photoresist layer which, in known manner, can be made to develop a surface relief in dependence upon the extent to which they have been exposed to light.

It is also considered advantageous to use for the light-sensitive material a simple photographic layer, with the photographic layer being developed and rehalogenated or bleached and tanned, in per se known manner, in order to form the desired variations in the optical path length of the light-sensitive photographic layer.

According to one advantageous concept of the method of the invention, it is possible to begin with a zone plate comprised of concentric annular lens portions having different respective focal lengths. The focal lengths of all the annular lens portions of such a zone plate together define a focal surface for the lens arrangement. It is contemplated, according to one concept of the invention, to locate the light-sensitive material to be transformed into a Fresnel lens in the just-mentioned focal surface. It is furthermore contemplated to employ a rotation-symmetric light source, in cooperation with the zone plate, for the purpose of converting the light-sensitive layer located in the just-mentioned focal surface into a Fresnel lens.

According to another advantageous concept of the invention a holding form, having the configuration of the aforementioned focal surface, is provided, for the purpose of supporting the light-sensitive material which is to be transformed into a Fresnel lens. Pneumatic or other means can be employed to hold the light-sensitive material against the just-mentioned form, so that such light-sensitive material will become closely fitted into the focal surface of the Fresnel zone plate. The light source used to expose the light-sensitive layer, to transform the layer into a Fresnel lens, is a rotation-symmetric light source concentric with the plurality of annular lens segments mentioned before and located in the focal plane of a collimator. The rotation-symmetric light-source can have the form of a plurality of point light sources arranged on a radially extending rotating arm, to create a rotation-symmetric light source. Alternatively, the light source can be provided in the form of an elongated, radially extending rotating light source having a light intensity which varies in the radial direction of the rotating light arrangement. As a still further possibility for the rotation-symmetric light source arrangement, use can be made of a so-called Axicon device, per se known in the art, and described below. The Axicon device is a variable-radius annular light source.

The novel features which are considered as characteristic of the invention are set forth in particular in the appended claims. The invention itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENT

Figure 1:
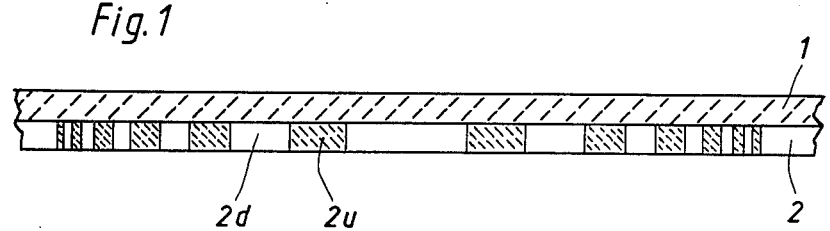
FIG. 1 is a diametral section through a zone plate.

FIG. 1 is a section through a zone plate, the section being taken along a diametral plane. The zone plate is comprised of a first layer 1 serving as a carrier for an exposed and developed photographic emulsion 2. The photographic emulsion 2 is exposed, in a known manner, in such a way as to be composed of substantially transparent or translucent concentric annular portions 2d alternating with substantially opaque concentric annular portions 2u. Such zone plates are conventionally formed by the interference of spherical wavefronts.

Figure 2:
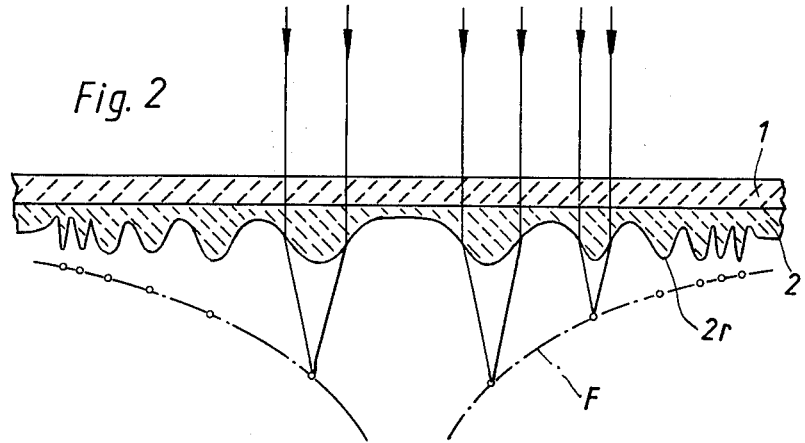
FIG. 2 is a diametral section through a phase lens formed from the zone plate of FIG. 1, with the focal surface defined by the focal points of the phase lens being indicated in the Figure.

FIG. 2 is a section through the zone plate of FIG. 1, again taken along a diametral plane, after bleaching and rehalogenation of the photographic emulsion 2 of the zone plate of FIG. 1. It will be noted that, as a result of sun bleaching and rehalogenation, a surface relief 2r has developed on the lower surface (as seen in the Figure) of the emulsion layer 2. This surface relief has been greatly exaggerated in the drawing, for the sake of clarity. In addition to the surface relief evident from FIG. 2, there is also a corresponding variation in the refractive index of the material of the emulsion layer 2.

The chemical principles which result in the development of the surface relief and in the radical variation of the refractive index are per se known in the art, and disclosed, for example, in J. H. Altman, "Pure relief Images . . . ", Applied Optics, Oct. 1966, Vol. 5, No. 10, page 1689. The silver on those portions of the emulsion layer 2 which has been exposed to light (which portions become dark in response to such exposure) are thereafter bleached, whereafter the gelatin of the emulsion layer 2 is tanned. The bleaching of the emulsion layer 2 of the zone plate of FIG. 1 results in the development of the radial variation of the refractive index. The subsequent tanning operation results in the development of the concentric-circle surface relief. The thusly bleached and tanned emulsion layer 2 is uniformly light transmissive. Light rays passing through the different adjoining portions of the plate shown in FIG. 2 do not undergo differing changes in intensity. However, light rays passing through the different adjoining portions of the plate shown in FIG. 2 do undergo different phase shifts relative to each other. For this reason, a plate such as shown in FIG. 2 is referred to as a phase lens. Inasmuch as such a phase lens is comprised of concentric annular zones, it is also properly referred to as a zone phase lens.

Specific methods of converting a zone plate like that shown in FIG. 1 into a zone phase lens like that shown in FIG. 2 are known in the art.

FIG. 2 shows the location of the focal point, or focal ring, for each annular zone of the phase lens. It will be seen that these focal points together define a focal surface, designated F in FIG. 2. The focal length of each annular zone of the phase lens is approximately proportional to the width of the respective annular zone. Parallel rays of light incident upon the zone phase lens of FIG. 2 will be refracted and converge to form concentric annular foci at the respective focal rings of the annular lens zones. The thusly defined focal plane F is seen to have a generally funnel-shaped configuration.

Figure 3:
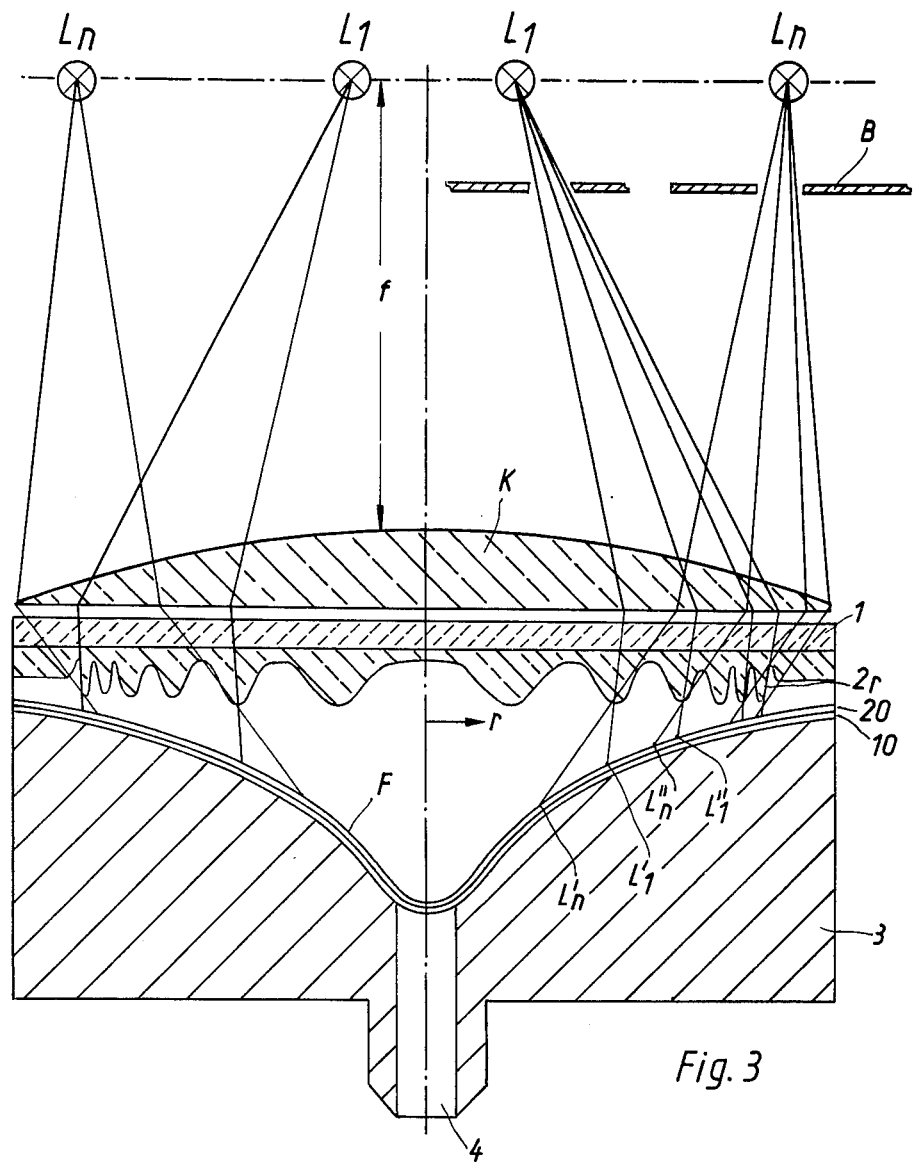
FIG. 3 is an arrangement for producing a Fresnel lens controlled exposure of a light-sensitive material.

The zone phase lens 1, 2 of FIG. 2 is used in the arrangement of FIG. 3. The arrangement of FIG. 3 includes a rotation-symmetric light source arrangement $L_1 \ldots L_n$. These light sources are employed to expose to light a light-sensitive layer 20, supported on a carrier layer 10, and deformed to occupy exactly the focal surface F of the zone phase lens 1, 2. The individual light sources $L_1 \ldots L_n$ are located in the focal plane of a collimator K located just above the zone phase lens 1, 2. A shield B provided with a plurality of apertures serves to limit the rays of light emitted from the light sources $L_1 \ldots L_n$. The light rays emitted by sources $L_1 \ldots L_n$ travel through collimator K, are collimated to some extent, and then pass through the zone phase lens 1, 2, intersecting the focal surface F at various points on the focal surface F. By suitably preselecting the intensity of the light sources $L_1 \ldots L_n$ it becomes possible to establish a desired light intensity distribution over the focal surface F. The intensity of the light sources $L_1 \ldots L_n$ is so chosen as to expose different concentric annular portions of the photosensitive layer 29 to varying intensities of light, the exposure of the different concentric annular portions of layer 20 differing not only from each other, but advantageously also varying in radial direction within each annular portion. According to the invention it is specifically contemplated to establish over the focal surface F a distribution of light intensity comprised of concentric annular zones, with the light intensity in each of the annular zones increasing in radially inward direction within the respective zone. With such a light distribution, the photosensitive layer 20, after being treated in one of the ways mentioned above, can be given the surface relief depicted in FIG. 4, which is shown greatly exaggerated.

Figure 4:
FIG. 4 is a diametral section through a Fresnel lens produced according to the invention.

Specifically, after the photosensitive layer 20 has been exposed to the rotation-symmetric light source, as described above, the resulting Fresnel zone plate is converted into a zone phase lens in the manner described above, for example by bleaching and/or subsequent tanning, whereby there is imparted to the surface of the zone plate formed in FIG. 3 from layer 20 the surface relief shown in FIG. 4 and/or a corresponding internal variation in the refractive index of the material. The resulting product acts like a Fresnel lens having a high efficiency and a single focal point. The unusable central portion of the product shown in FIG. 4 is blocked off by a circular shield M.

The photographic layer 20 supported on its carrier 10 is held properly in place in the focal surface F of the zone lens 1, 2 by means of a suitably configured form 3 provided with a suction passage 4. It is to be understood that the deformation of the photographic layer 20 and its support 10 is greatly exaggerated in the illustration of FIG. 3. The depression in the surface of photographic layer 20 is shown to be very deep near the axis of the arrangement, for purposes of clarity. However, the actual extent of this maximum surface depression may be less than a millimeter, which is so slight, relatively speaking, that a simple flat carrier layer 10 coated with an emulsion 20 can easily be deformed to the extent necessary for the intended purpose.

The relationship between the focal length of each annular element of the zone phase lens 1, 2 in FIG. 3 is $(1/\sqrt{r})$, where $r$ is the radial coordinate of the particular annular lens element. Accordingly, the shape of the rotation-symmetric focal surface F will be similarly related to the radial distance from the axis of the arrangement.

As mentioned before, the light focussed by the zone phase lens 1, 2 of FIG. 3 onto the photographic layer 20 originates from a rotation-symmetric light source arrangement. Several such light source arrangements are possible. The simplest such light source arrangement would be comprised of a single point light source mounted for rotation about the optical axis of the system, with the radial distance of such point light source from the optical axis being adjustable. Using such a light source arrangement, the light source is made to rotate at different radial distances from the optical axis. This scheme is indicated in FIG. 5a. In FIG. 5a there is depicted a point light source $L_i$ mounted for rotation with a rotatable radially extending support member about the optical axis O of the system. The point light source $L_i$ is movable along the length of the radially extending rotatably mounted support member, to vary the radius of the annulus of light which is produced with the illustrated arrangement. As the radial distance $r$ of the light source $L_i$ changes during the exposure process, preselected variations in the intensity of the light emitted by light source $L_i$ are made, to expose the photographic layer 20 with light having exactly the intensity distribution necessary to create the desired rotationally symmetric zones in the photographic layer 20. Needless to say, an arrangement like that shown in FIG. 5a will include suitable (non-illustrated) drive means for effecting rotation of the support arm, and may also advantageously contain suitable (non-illustrated) radius-varying means for varying the radius of the point light source $L_i$ according to a pre-established scheme. Furthermore, if the intensity of the light emitted by the source $L_i$ is varied with changes in the radial distance $r$ of the source from the optical axis, then suitable (non-illustrated) means can be provided for controlling the intensity of the emitted light as a preselected function of the radial distance $r$ of the light source $L_i$; such means could include for example a suitably designed screen of transparent material, placed in front of the light source $L_i$, with the transparency of such screen varying in radial direction in such a manner as to establish a preselected relationship between the light emitted from the point source $L_i$ and the radial distance $r$ of source $L_i$ from axis O.

Figure 5B:
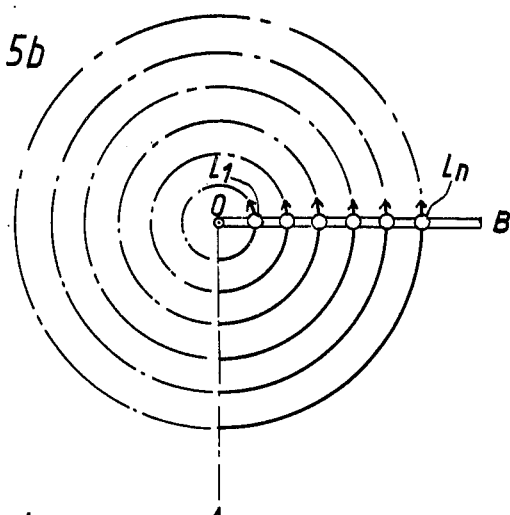
FIGS. 5a and 5b depict two different rotation-symmetric light sources.
Figure 5A:
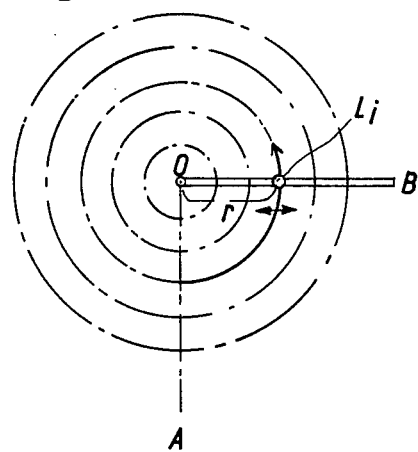

Instead of using a single adjustable point light source, as described with respect to FIG. 5b, it would also be possible to employ a plurality of such point light sources $L_1 \ldots L_n$, radially aligned, as shown for example in FIG. 5b. As the supporting member mounting the illustrated light sources $L_1 \ldots L_n$ rotates in the indicated direction from A to B, a circumferentially incomplete segment, or a circumferentially complete segment, of the light-sensitive layer 20 can be exposed.

Figure 6:
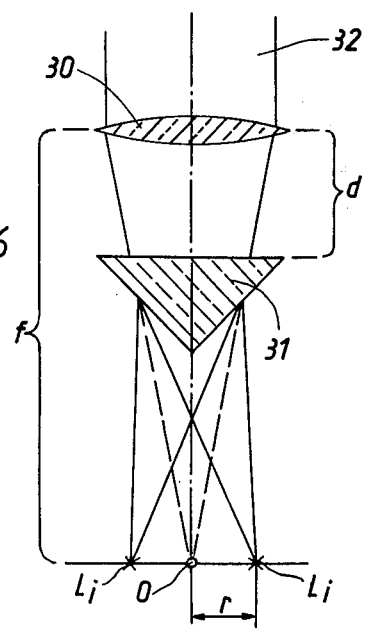
FIG. 6 is a schematic depiction of another rotation-symmetric light source.

A still further possibility for the rotation-symmetric light source is depicted in FIG. 6, which illustrates in schematic form a so-called "axicon" arrangement. Details of the axicon arrangement are disclosed in McLeod, John, "The Axicon, A New Type of Optical Element", JOSA, 44, 1954, 8, page 292.

The axicon is a rotation-symmetric light source operating differently from the light sources of FIGS. 5a and 5b. The axicon produces a variable-radius annulus of light.

The axicon schematically depicted in FIG. 6 is comprised of an optical system 30 through which are passed parallel rays 32 from a suitable light source. The parallel rays 32 are focussed, by means of optical system 30 and a conical focussing member 31, to form an annular image $L_i$. The radius $r$ of this annular image can be varied by varying the focal length of the optical system 30, for example, if the optical system 30 has the form of a zoom objective, and/or by varying the distance $d$ between the conical focussing element 31 and the optical system 30.

The variations, along the radial direction, of the extent to which the different concentric annular portions of layer 20 in FIG. 3 are exposed to light, can be brought about by varying the length of exposure time for the different annular portions and/or can be brought about by varying the intensity of the light incident upon the layer 20 of FIG. 3. As mentioned previously, the desired sawtooth-shaped profile of the finished product shown in FIG. 4 can be achieved by establishing in advance a suitable exposure scheme for the layer 20 in FIG. 3. As is well known, there will not be a simple proportional relationship between the total exposure of the different annular portions of layer 20 in FIG. 3 and the resulting variation in layer thickness and refractive index. However, the intensities of light and the exposure times necessary to bring about exactly the layer-thickness variations and/or refractive-index variations desired can easily be worked out, once the desired profile for the finished lens shown in FIG. 4 is decided upon.

As a still further possibility for the rotation-symmetric light source arrangement, use can be made of a radially extending linear light source the intensity of whose emitted light varies along the length of such light source. Such a light source can be formed from a linear light source by placing in front of it a plate of variable transparency, having a radial transparency variation corresponding to the radial variation desired for the light source intensity. In selecting the intensity for each small portion of such a light source, it is of course necesssary to keep in mind that the speeds of the light source portions nearer the optical axis will be lower than the speeds of the light source portions further from the optical axis, and that the exposure duration will vary accordingly.

It has already been mentioned that some of the dimensions of the various components have been greatly exaggerated, for the sake of visibility. The following exemplary specifications will give a more realistic picture of the order of dimensions involved:

When using a zone lens having a focal length of 95 mm and having a diameter of 20 mm, with an aperture of $f$:4.7, and with a covered central portion 2 mm in diameter, a Fresnel lens is produced having the following dimensions:

| inner: | radius | 1 mm |
|---|---|---|
| | period number | 9 |
| | number of annular lens segments per mm in radial direction | 16.7/mm |
| | focal length of the Fresnel lens | 300 microns |
| Outer: | radius | 10 mm |
| | period number | 90 |
| | number of annular lens segments per mm in radial direction | 178/mm |
| | focal length of the Fresnel lens | 28 microns |

In FIG. 3 the maximum depression of the layer 20, which is at the optical axis of the arrangement, equalled 0.3 mm.

It will be understood that each of the elements described above, or two or more together, may also find a useful application in other types of constructions differing from the types described above, and in other types of methods differing from the types described above.

While the invention has been described and illustrated as embodied in a method and apparatus for the making of Fresnel lenses, it is not to be considered limited to the details disclosed, since many modifications can be made without departing in any way from the spirit and concept of the invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. A method of forming a circular one-focal-point Fresnel lens from a layer of light-sensitive material of the type which after exposure to light can be made to undergo a change of optical path-length dependent upon the amount of exposure to light by subjecting the light-sensitive material to a predetermined reaction, comprising, in combination, the steps of positioning a layer of such light-sensitive material coincident with the focal surface of a circular phase zone lens comprised of concentric annular lens components whose successive radii are proportional to the square roots of successive integers and whose successive focal lengths are inversely proportional to the square roots of the respective integers so as to together define a focal surface each portion of which is spaced from the phase zone lens by a distance inversely proportional to the square root of the distance of the portion from the central symmetry axis of the circular phase zone lens; directing light towards that side of the circular phase zone lens which faces away from the layer of light-sensitive material, so that the light emerges through that side of the circular phase zone lens which faces towards the layer of light sensitive material and impinges upon the layer of light-sensitive material; and converting the exposed layer of light-sensitive material into a circular one-focal-point Fresnel lens by subjecting the light-sensitive material to the predetermined reaction to cause each exposed portion of the layer of light-sensitive material to undergo a change of optical path-length corresponding to the exposure of such portion.

2. A method of forming a circular one-focal-point Fresnel lens from a layer of light-sensitive material of the type which after exposure to light can be made to undergo a change of optical path-length dependent upon the amount of exposure to light by subjecting the light-sensitive material to a predetermined reaction, comprising, in combination, the steps of positioning a layer of such light-sensitive material coincident with the focal surface of a circular phase zone lens comprised of concentric annular lens components whose successive radii are proportional to the square roots of successive integers and whose successive focal lengths are inversely proportional to the square roots of the respective integers so as to together define a focal surface each portion of which is spaced from the phase zone lens by a distance inversely proportional to the square root of the distance of the portion from the central symmetry axis of the circular phase zone lens; exposing the layer of light-sensitive material by directing light towards that side of the circular phase zone lens which faces away from the layer of light-sensitive material, so that the light emerges through that side of the circular phase zone lens which faces towards the layer of light-sensitive material and impinges upon the layer of light-sensitive material, with the light passing through the concentric annular lens components of the circular phase zone lens being focussed onto the layer of light-sensitive material lying in the focal surface in the form of concentric annular zones of light respectively corresponding to the concentric annular lens components of the circular phase zone lens, the intensity of the light passed through the circular phase zone lens and the duration of the passage of the light being such that at the end of the exposure the total exposure to light within each of the concentric annular zones of light increases in the radially inward direction; and converting the exposed layer of light-sensitive material into a circular one-focal-point Fresnel lens by subjecting the exposed light-sensitive material to the predetermined reaction to cause each exposed portion of the layer of light-sensitive material to undergo a change of optical path-length corresponding to the total exposure of such portion to light, so that the layer of light-sensitive material is converted into a Fresnel lens comprised of concentric annular lens components corresponding to the concentric annular zones of light, with each concentric annular lens component of the thusly produced Fresnel lens having an optical path-length which increases in the radially inward direction in correspondence to the radially inwardly increasing exposure of the portion of the light-sensitive layer corresponding to the annular lens component of the thusly produced Fresnel lens.

3. The method defined in claim 2, wherein the light-sensitive material is a dichromated gelatin.

4. The method defined in claim 2, wherein the light-sensitive material is a photoresist.

5. The method defined in claim 2, wherein the light-sensitive material comprises silver halide, and wherein the step of subjecting the exposed light-sensitive material to the predetermined reaction comprises developing the silver halide and thereafter rehalogenating the same to cause each portion of the layer of light-sensitive material to undergo a change in its respective optical path-length dependent upon the extent to which the respective portion has been exposed to light.

6. The method defined in clam 2, wherein the step of subjecting the light-sensitive material to the predetermined reaction comprises bleaching the exposed light-sensitive material to produce in each exposed portion of the light-sensitive material an alteration in the refractive index of the respective portion dependent upon the extent to which the respective portion has been exposed to light.

7. The method defined in claim 2, werein the step of subjecting the exposed light-sensitive material to the predetermined reaction comprises tanning the exposed light-sensitive material to produce in each exposed portion of the light-sensitive material an alteration in the thickness of the respective portion, and thereby an alteration in the optical path-length of the respective portions, dependent upon the extent to which the respective portion has been exposed to light.

8. The method defined in claim 2, wherein the step of subjecting the exposed light-sensitive material to the predetermined reaction comprises bleaching and tanning the exposed light-sensitive material to produce in each exposed portion of the light-sensitive material an alteration in the refractive index and an alteration in the thickness of the respective portion, and thereby an alteration in the optical path-length of the respective portion, dependent upon the extent to which the respective portion has been exposed to light.

9. The method defined in claim 2, wherein the step of exposing the layer of light-sensitive material comprises generating the light using a rotation-symmetric light source.

10. The method defined in claim 2, wherein the step of positioning the layer of light-sensitive material coincident with the focal surface of the circular phase zone lens comprises positioning the layer of light-sensitive material on a form having a surface congruent to and approximately coincident with the focal surface of the circular phase zone lens, and forcing the layer of light-sensitive material to assume the shape of the focal surface by holding the layer against the surface of the form by the force of suction.

11. The method defined in claim 2, wherein the step of exposing the layer of light-sensitive material comprises positioning a rotation-symmetric light source concentric to the optical axis of the circular phase zone lens and collimating the light emitted by the rotation-symmetric light source before such light enters the circular phase zone lens.

12. The method defined in claim 11, wherein the step of positioning a rotation-symmetric light source concentric to the optical axis of the circular phase zone lens comprises rotating a point light source about the optical axis of the circular phase zone lens and varying the radial distance of the point light source from the optical axis of the circular phase zone lens.

13. The method defined in claim 11, wherein the step of positioning a rotation-symmetric light source concentric to the optical axis of the circular phase zone lens comprises rotating about the optical axis of the circular phase zone lens a plurality of radially aligned point light source respectively emitting light of different intensities.

14. The method defined in claim 11, wherein the step of positioning a rotation-symmetric light source concentric to the optical axis of the circular phase zone lens comprises rotating about the optical axis of the circular phase zone lens a radially extending linear light source provided with a plurality of radially successive surface portions having different respective light transmissivities.

15. The method defined in claim 11, wherein the step of positioning a rotation-symmetric light source concentric to the optical axis of the circular phase zone lens comprises positioning an axicon arrangement concentric to the optical axis of the circular phase zone lens to form on the focal surface of the circular phase zone lens a variable-radius annular light image.

\* \* \* \* \*